Figure 1:
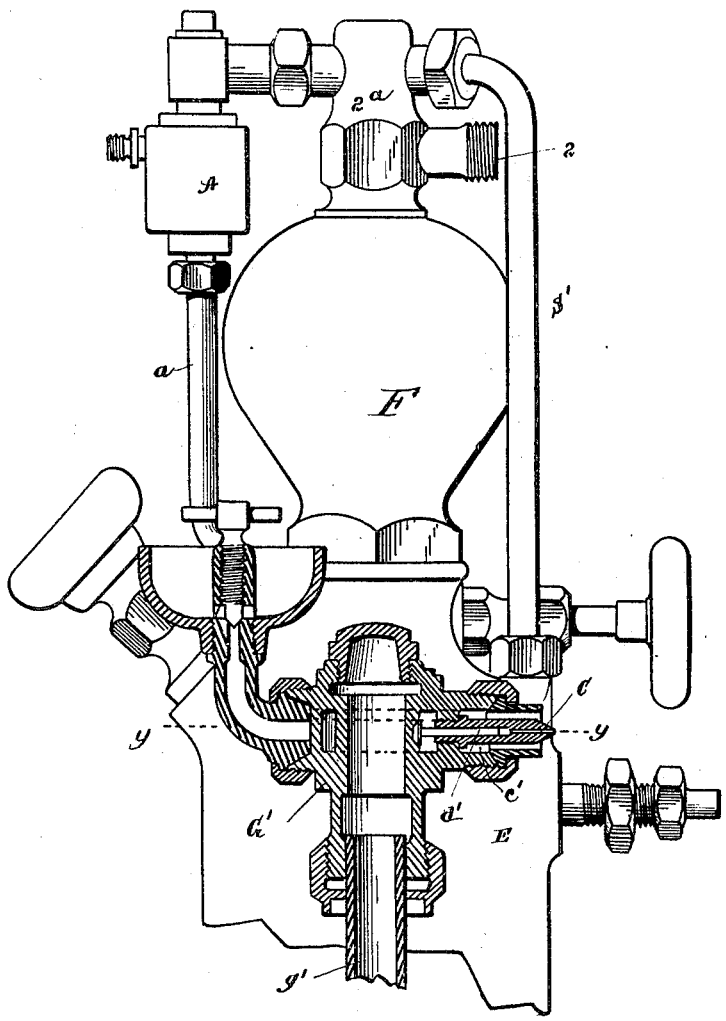

No. 681,639. Patented Aug. 27, 1901.
C. B. HODGES.
LUBRICATOR.
(Application filed June 24, 1896.)
(No Model.) 5 Sheets—Sheet 1.

WITNESSES
D. H. Bradford
Virginia M. Clough

INVENTOR
Clarence B. Hodges
By Parker & Burton
Attorneys.

No. 681,639. Patented Aug. 27, 1901.
C. B. HODGES.
LUBRICATOR.
(Application filed June 24, 1896.)
(No Model.) 5 Sheets—Sheet 2.
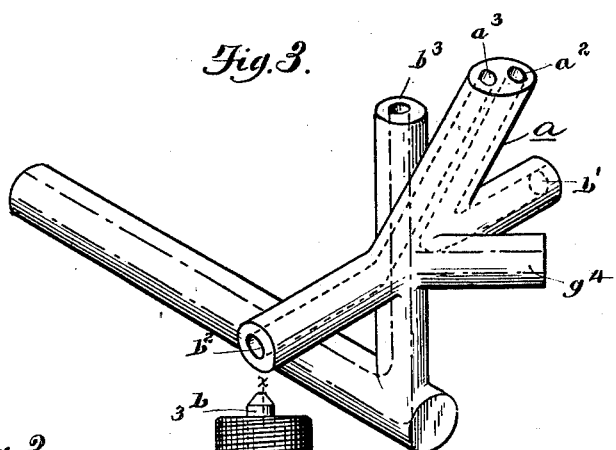
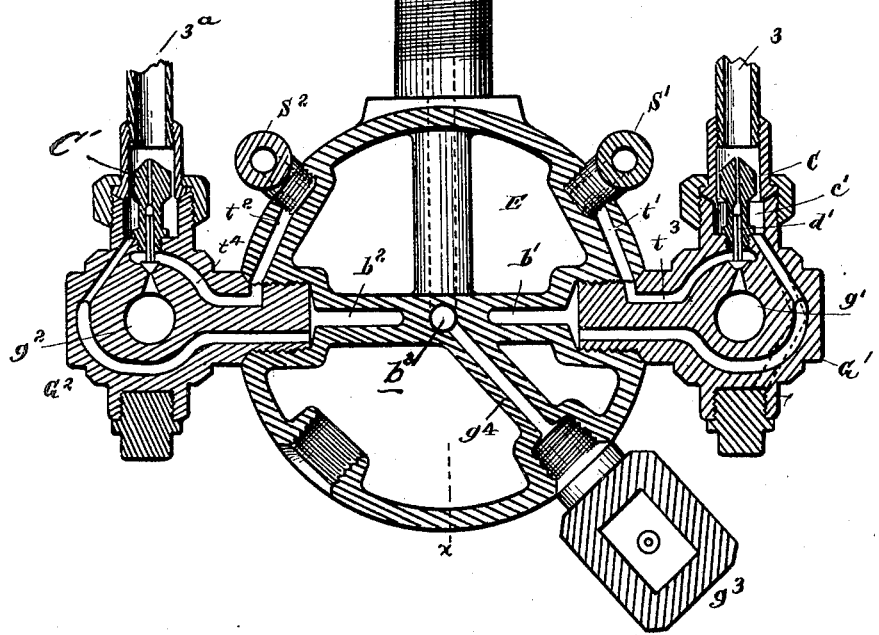
WITNESSES
H. W. Bradford
Virginia M. Clough
INVENTOR
Clarence B. Hodges.
By Parker & Burton
Attorneys.

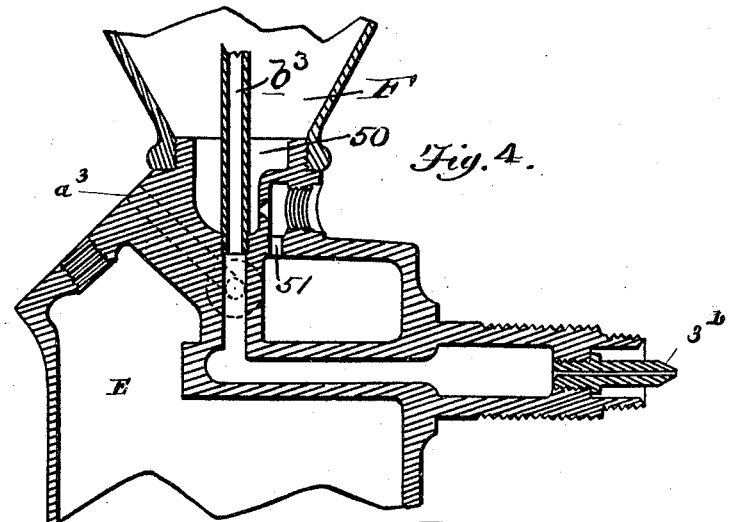
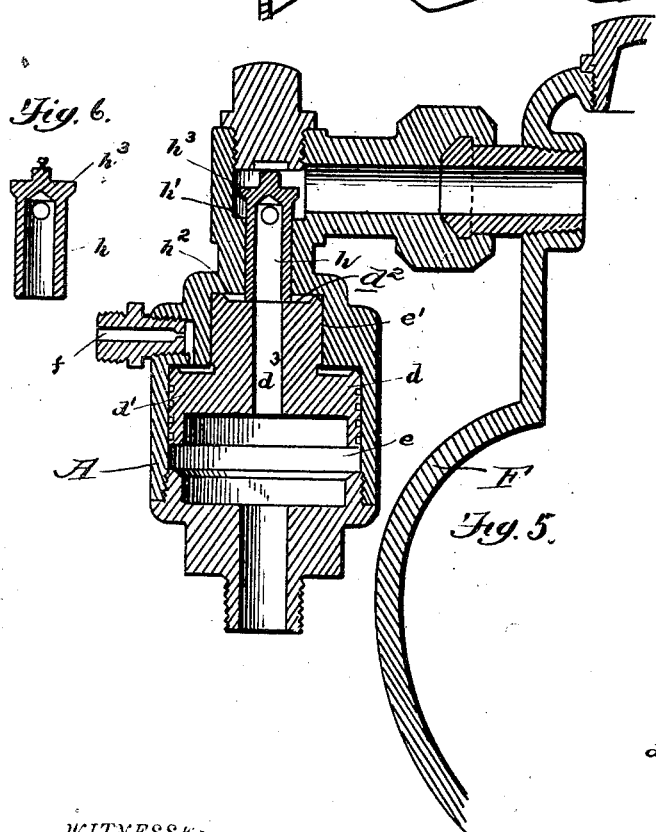
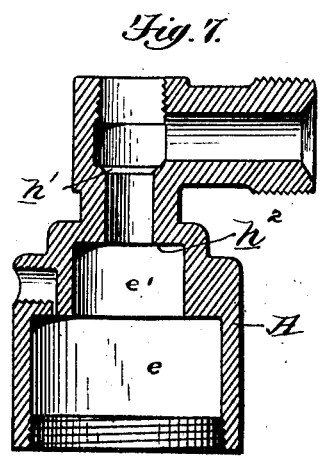
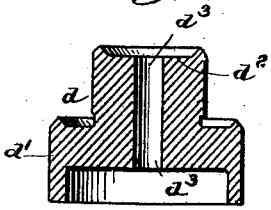

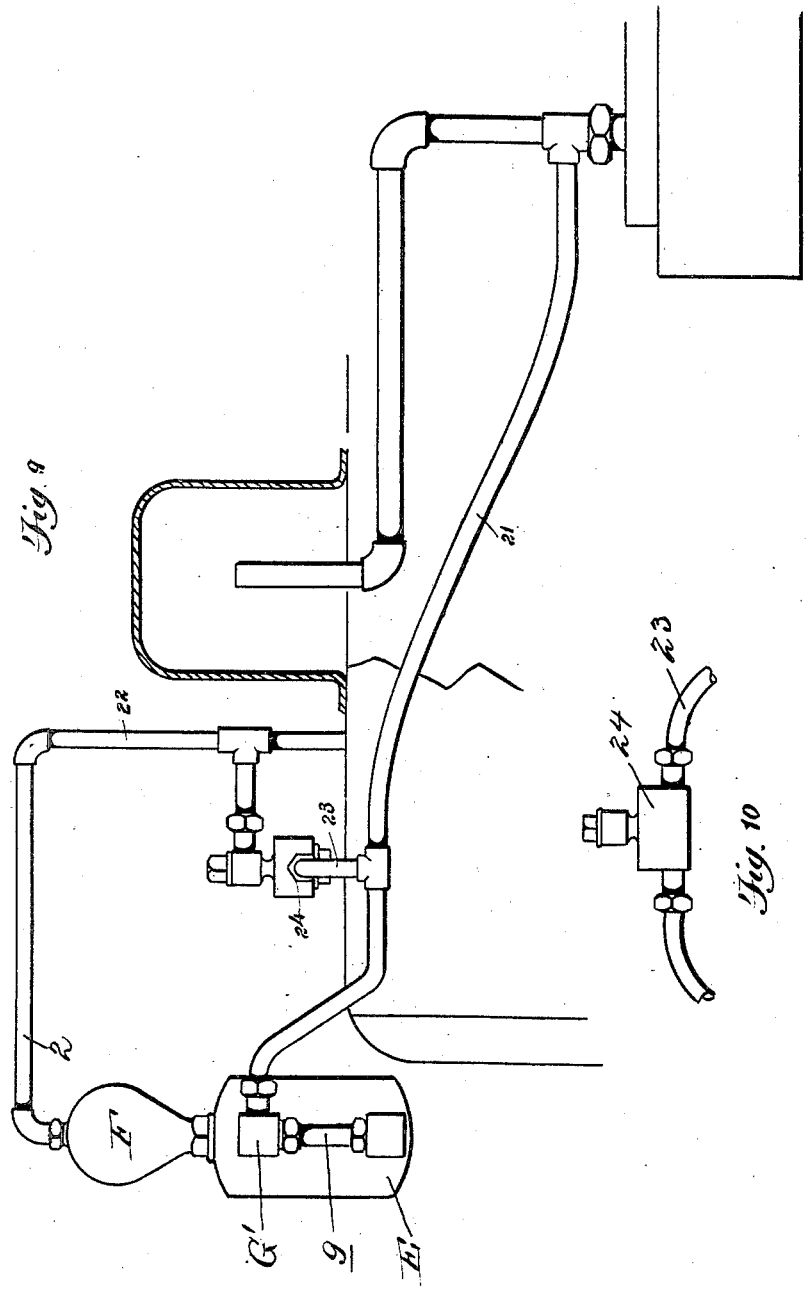

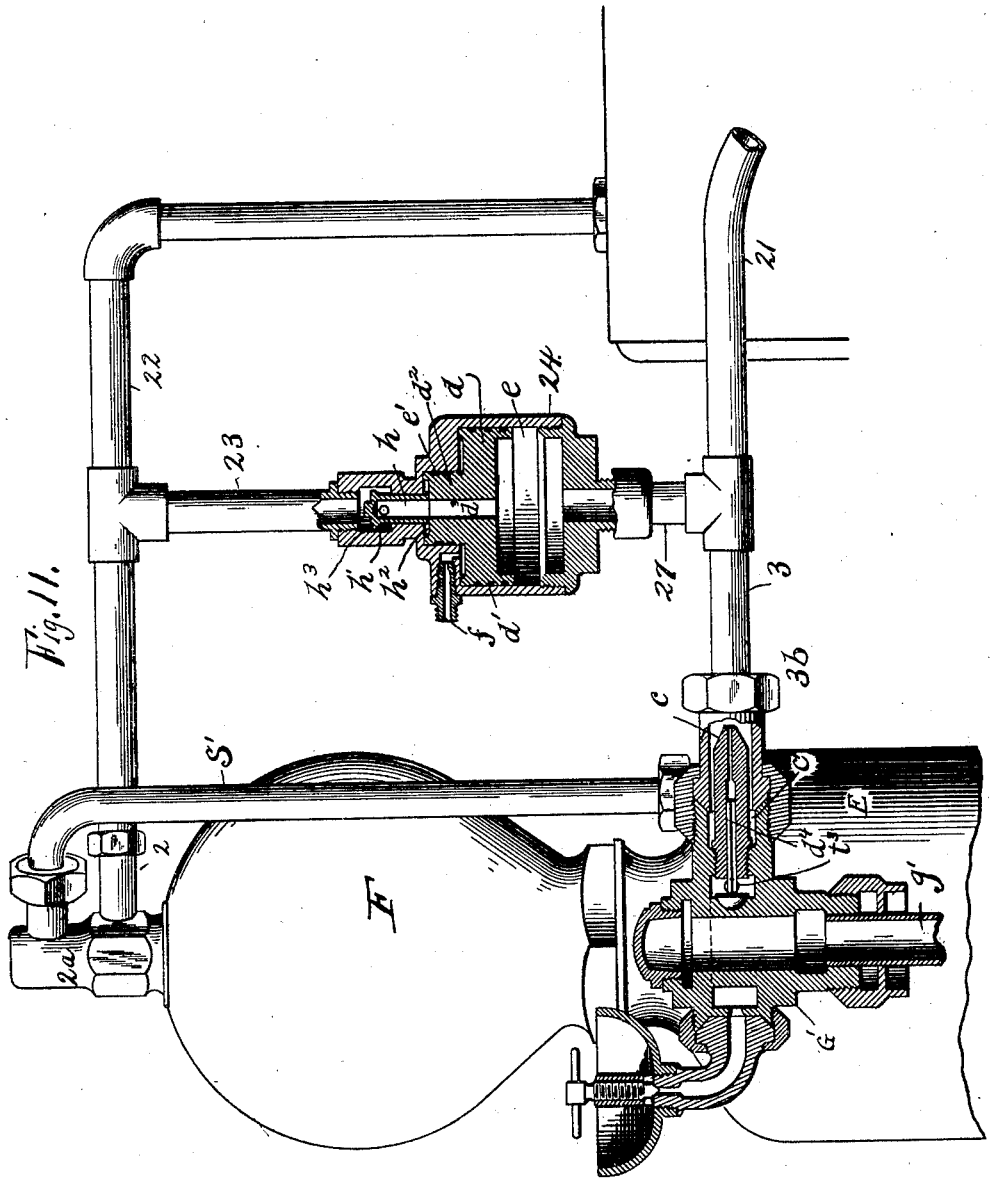

UNITED STATES PATENT OFFICE.

CLARENCE B. HODGES, OF DETROIT, MICHIGAN.

LUBRICATOR.

SPECIFICATION forming part of Letters Patent No. 681,639, dated August 27, 1901.

Application filed June 24, 1896. Serial No. 596,758. (No model.)

*To all whom it may concern:*

Be it known that I, CLARENCE B. HODGES, a citizen of the United States, residing at Detroit, county of Wayne, State of Michigan, have invented a certain new and useful Improvement in Lubricators; and I declare the following to be a full, clear, and exact description of the same, such as will enable others skilled in the art to which it pertains to make and use the same, reference being had to the accompanying drawings, which form a part of this specification.

This invention relates to lubricators, and has for its object primarily improvements in that class of lubricators which are intended to be used in connection with locomotives where the lubricating-oil rises from an oil-receptacle through a column of water into the steam-pipe (technically called the "tallow-pipe") and leads thence to the place where the lubricant is to be employed. A locomotive-engine requires a supply of oil that shall be practically constant and regular so long as the piston is moving, whether the cylinder be taking steam or not. Locomotive-engines are run under varying supplies of steam and sometimes with no supply of steam whatever—as, for example, when on a downgrade. Previous to my invention the balanced condensation displacement lubricator has been for some time used, and this character of lubricator is intended to deliver from the oil-cup a regular supply of oil that is forced out from the top by the condensation of steam into water which collects under the oil in an oil-cup. The contents of the oil-cup is balanced by equalizing-pipes, and these are employed to overcome a difficulty which arises from fluctuations of back pressure in the tallow-pipe. After the lubricator balanced by equalizing-pipes came into use it was found that equalizing-pipes were not of themselves sufficient to entirely overcome the tendency to produce an irregular feed of oil and at times to siphon out or draw out the contents of the oil-cup too rapidly, and the feature of a choked passage on the cylinder side of the equalizing-pipes was added. This choked passage while it overcame one difficulty introduced a new trouble, as it was found that although the oil now moved with sufficient regularity from the oil-cup through the choked passage it did not travel forward to the cylinder properly, but frequently accumulated in the pipe during the time while the cylinder was taking steam, and the accumulated mass of oil was discharged into the cylinder when the engine was at rest and the throttle shut off at a time when the engine did not need lubrication. My invention is intended to overcome the difficulty arising from this cause.

I conveniently employ a balanced lubricator, with either external or internal equalizing-pipes, either such a one as is described in Patent No. 291,847, issued to myself and C. H. Hodges, January 8, 1884, or in Patent No. 308,258, issued to myself and E. McCoy, November 18, 1884, and I use in the lubricator which I employ a passage-way of small diameter or "choked passage," which is located between the oil-reservoir and the tallow-pipe, through which steam from the equalizing-pipe and oil from the reservoir pass on their way to the tallow-pipe. The oil is forced through this choked passage by the steam from the equalizing-pipe and after escaping from the choked passage is carried forward by an auxiliary supply of steam that is arranged to flow while the throttle is open and is arranged to be checked when the throttle is closed and the cylinder therefore not taking steam, and consequently there is no longer back pressure to prevent the proper action of the small flow of steam through the choked passage.

My invention then is found in a device using a passage for a flow of steam which serves to take the oil after it has passed from the reservoir and carry it against back pressure to the cylinder of the engine and means to close the passage, and thus control the flow of this auxiliary steam, so that it may flow when the cylinder is taking steam and cease to flow when the cylinder ceases to take steam.

In carrying out the invention I introduce into the structure a means actuated by steam-pressure to shut off or control the auxiliary supply of steam necessary to produce the desired feed, leaving, however, the small choked passage constantly open, so that lubrication of the engine shall not cease at times while the piston is moving but the cylinder is not taking steam.

In the drawings, Figure 1 shows the upper portion of the lubricator and the outside connections therewith. Parts of this drawing are in section. Fig. 2 is a horizontal section at the line $y\,y$ of Fig. 1. Fig. 3 is a diagram showing the relative arrangement of some of the pipes and passage-ways inside the casing of the lubricator. Fig. 4 is a vertical section through the lubricator at the line $x\,x$ of Fig. 2. This figure shows the equalizing-pipe and the discharge-nozzle, which is used in connection with the oil-conduit leading to the air-brake. The equalizing-pipe of this figure rises on the inside of the condenser. Figs. 5, 6, 7, and 8 are details showing the construction of the automatic controlling-valve, the casing of which is seen at A in Fig. 1. Fig. 9 shows a variation in the location of the pipe through which the auxiliary supply of steam is carried. Fig. 10 is an elevation of the pipe connections with the valve-casing 24 of Fig. 9. Fig. 11 is a side elevation, partly in section, of a lubricator with external equalizing-pipes, and it shows also a pipe for auxiliary steam and a controlling-valve connected therewith.

2 in Fig. 1 indicates a steam-pipe leading from the boiler, and 3 $3^a$ of Fig. 2 indicates the tallow-pipes leading to the cylinders on opposite sides of the locomotive, and $3^b$ indicates the oil-feed pipe, leading to the engine-cylinder of the air-brake.

The oil-reservoir E contains the oil and the water of condensation which accumulates in the condenser F and drops by gravity from there through passages 50 and 51 (seen in Fig. 4) into the reservoir E. The accumulating water lifts the oil always to the top of the reservoir, whence it is fed in the way usual in this class of lubricators through inverted-U-shaped tubes to the various pipes that lead to the working parts to be lubricated. Such U-shaped tube can be seen in Patent No. 322,291. Each of the U-shaped tubes has one branch within the cup and one branch outside of the cup, and the outside branch in each case is in part composed of a glass sight feed-tube through which observation can be made to determine whether the oil is feeding properly. The position of these sight-tubes is indicated at $g'\,g^2\,g^3$. Of these the passage through the tube at $g^3$, through the pipe $g^4$, and through the constricted passage $3^b$ is substantially the same as that heretofore in common use. With respect to this passage the oil in the cup is in a balanced condition between the steam from the pipe 2, which enters the condensing-chamber at the top thereof, and the back pressure through the choked passage $3^b$ and the constant pressure of the steam passing through the equalizing-pipe $b^3$. The fittings G' G² are, however, constructed to be used in carrying out my invention and contain features not found in the parts just described. Inasmuch as they are exactly similar, a description of one will suffice for both, premising that the steam that enters at the rear or on the oil-cup side of the constricted passage C traverses pipe S' and the steam that enters at the rear of the restricted passage C' traverses the equalizing - pipe S² and that the steam traversing the equalizing-pipes S' and S² comes from the common supply - pipe 2. From the pipe S' a passage $t'$, constructed in the wall of the cup, leads into the fitting G', where it communicates with a passage $t^3$ in the fitting and is continued to the end of the restricted passage C, into which it leads on the oil-cup side of the nipple, and is continued through the nipple between the wings of the winged guide of the valve $d'$, the passage through the nipple being the contracted or constricted passage hereinbefore spoken of. This constricted passage opens into the larger pipe, that goes directly to the cylinder and which has been called herein the "tallow-pipe" 3. From the head 2 a pipe $a$, external to the condenser, leads downward to the oil-cup and divides. One branch $a^2$ communicates with a passage $b'$, that leads to the fitting G', and another branch $a^3$ communicates with a passage $b^2$ and leads to the fitting G². The passage in the branch $b'$ is continued through the fitting G' and terminates in a chamber $c'$, which is on the tallow-pipe side of the engagement between the nipple C and the fitting, but is behind the extreme end of the nipple C, and from the chamber there is free communication around the nipple to the tallow-pipe. The passage leading from $b^2$ to the fitting G² and to the tallow-pipe $3^a$ is of similar construction. It has not been found necessary to make this same provision for a passage-way for auxiliary steam from the pipe 2 to the pipe $3^b$ which leads to the air-brake, but a similar provision could be made for it if it were found desirable. In order that the steam entering the tallow-pipes 3 and $3^a$ from the pipe 2 through the passage mentioned may be automatically closed off when the steam to the cylinders is throttled, I interpose at A in the pipe $a$ a double - acting valve, which is shown in detail in Figs. 5, 6, 7, and 8. In the lower part of the casing A is a large valve-actuating piston $d$, through which there is a hole. This piston $d$ is a differential pistion having two heads, one of which is larger than the other. The larger head $d'$ fits in a chamber $e$ and the smaller head $d^2$ fits in a chamber $e'$, which is smaller in diameter than the chamber $e$. The live steam coming direct from the boiler engages with the face of the smaller head $d^2$ of the piston, while the reacting force from the steam in the cylinder or tallow-pipe is exerted against the larger face of the head $d'$. Where the chamber $e'$ opens out of the chamber $e$ there is a relief passage-way $f$, so that the piston is unbalanced by reason of the differential faces exposed to the two steam forces and by reason of the relief-valve $f$, which relieves the one side of the piston from all pressure on a zone equal to the difference in diameter of the two heads of the piston. Above the piston $d$ and engaging over the opening $d^3$, that passes through it, is a valve $h$, the stem of which extends into the neck between the valve-seat $h'$ and the face $h^2$, against which the upper or smaller face $d^2$ of the piston $d$ is adapted to engage. The stem of the valve $h$ is hollow and is provided with a passage-way into it below the head $h^3$, which is closed as the valve is forced downward. So long as the steam is passing freely to the cylinder the large piston $d$ is driven upward by the excess of pressure on its large face, lifts the valve $h$, and furnishes an unimpeded passage through the stem and through the hole in the piston; but as soon as the throttle is closed the back pressure from the cylinder ceases, while the pressure from the opposite direction from the boiler continues. This pressure drives the piston $d$ and the valve $h$ downward, the valve $h$ closes against the seat $h'$, and the flow of the steam ceases.

The form of structure shown in Figs. 1 to 4, inclusive, is the preferred form for a lubricator complete in itself; but the same principle may be applied in connection with lubricators that have been made, but in which provision was not made for the use of steam in the way herein described. By the construction of the valve and its actuating-piston as shown and described it will be seen that, in effect, a differential valve is produced, the purpose of separating the valve from the piston being largely to facilitate assembling and positioning of the parts.

As shown in Fig. 9, an ordinary lubricator (the lubricator shown in this figure is not provided with external equalizing-pipes) communicates with the cylinder and boiler through the tallow-pipe 21 and the steam-pipe 22, and an auxiliary pipe 23, provided with the automatic or steam-actuated valve in casing 24, is arranged to deliver steam into the tallow-pipe 21 between the lubricator and the cylinder. In this form the steam which acts to open the valve 24 is in a circuit of which the tallow-pipe forms one part, and it is not material where in this circuit the controlling-valve be placed.

Having thus described my invention, what is claimed as new, and desired to be secured by Letters Patent, is—

1. In combination with a lubricator provided with suitable ports and passage-ways, whereby the oil in the lubricator is balanced by steam-pressure, an oil-conducting pipe, a nozzle adapted to deliver the oil from the cup into the conducting-pipe, an auxiliary steam-passage leading from the boiler and adapted to deliver a second supply of steam into the oil-conducting pipe in front of the nozzle and between the nozzle and the cylinder, and means interposed in said auxiliary passage-way whereby the flow of steam is shut off when the main throttle is closed, substantially as described.

2. In combination with a lubricator, provided with suitable pipes and passage-ways whereby the contents of the lubricator are balanced between opposing forces, a tallow-pipe, an auxiliary steam passage-way adapted to furnish an auxiliary supply of steam to carry forward the lubricating-oil escaping from the oil-cup of the lubricator, and an automatically-actuated valve arranged to close said auxiliary passage, and to control steam passing therethrough, substantially as described.

3. In combination with a lubricator, provided with suitable pipes and passage-ways whereby the contents of the lubricator are balanced between opposing forces, a tallow-pipe, a passage-way through which an auxiliary supply of steam passes, and an unbalanced steam-actuated valve arranged to control the steam employed to carry the oil from the lubricator to the cylinder, properly located to close the passage-way through which an auxiliary supply of steam passes from the boiler to and from the tallow-pipe, substantially as described.

4. In combination with a lubricator provided with suitable pipes and passage-ways, whereby the contents of the lubricator are balanced between opposing forces, a tallow-pipe, an auxiliary steam passage-way, an unbalanced valve arranged to control the auxiliary steam and to be actuated in a closing direction by steam on its boiler side, and in an opening direction by back pressure from the cylinder, substantially as described.

5. In combination with a lubricator provided with suitable ports and passage-ways, connections leading thereto from the boiler, and connections leading therefrom to the tallow-pipe, an auxiliary steam-passage, a valve arranged to control the auxiliary steam and to be actuated to both open and close by the steam, having a case that is provided with a relief-opening on one side, substantially as described.

6. In combination with a lubricator provided with suitable pipes and passages whereby the contents thereof are balanced between opposing forces, a tallow-pipe arranged to communicate with the lubricator and with the steam-pipe which produces balance thereof, a restricted constantly open passage, a passage for producing in the tallow-pipe an increased flow of steam beyond that allowed by the restricted passage, and means actuated by variation of pressure for governing the increased flow of steam, substantially as described.

7. In combination with a lubricator provided with suitable pipes and passages whereby the contents thereof are balanced between opposing forces, a tallow-pipe arranged to communicate with the lubricator and with the steam-pipe which produces balance thereof, a restricted constantly open passage, a passage for producing in the tallow-pipe an increased flow of steam beyond that allowed by the restricted passage, and an automatic valve actuated by variation of pressure, for governing the increased flow of steam, substantially as described.

8. The combination with a lubricator provided with suitable pipes and passages whereby the contents thereof are balanced between the opposing forces, of an auxiliary passage adapted to supply an auxiliary supply of steam to carry forward the lubricant, and a valve arranged to be actuated by back pressure for controlling the movement of steam through the auxiliary passage, substantially as described.

9. In a balanced lubricator the combination of an oil-cup, an oil-delivery pipe, a port or passage for permitting an uninterrupted flow of steam into the oil-delivery pipe, a port or passage for permitting an increased flow of steam into the oil-delivery pipe and means serving to close the port or passage through which the increased flow of steam passes, brought into action by the establishment of a preponderance of pressure on the boiler side thereof.

10. In combination with a lubricator, provided with suitable pipes and passage-ways whereby the contents of the lubricator are balanced between opposing forces, a tallow-pipe, a passage-way through which an auxiliary supply of steam passes, and a valve arranged to be actuated automatically to control the steam employed to carry the oil from the lubricator to the cylinder, properly located to close the passage-way through which an auxiliary supply of steam passes from the boiler to and from the tallow-pipe, substantially as described.

In testimony whereof I sign this specification in the presence of two witnesses.

CLARENCE B. HODGES.

Witnesses:
CHARLES F. BURTON,
VIRGINIA M. CLOUGH.